Figure 1:
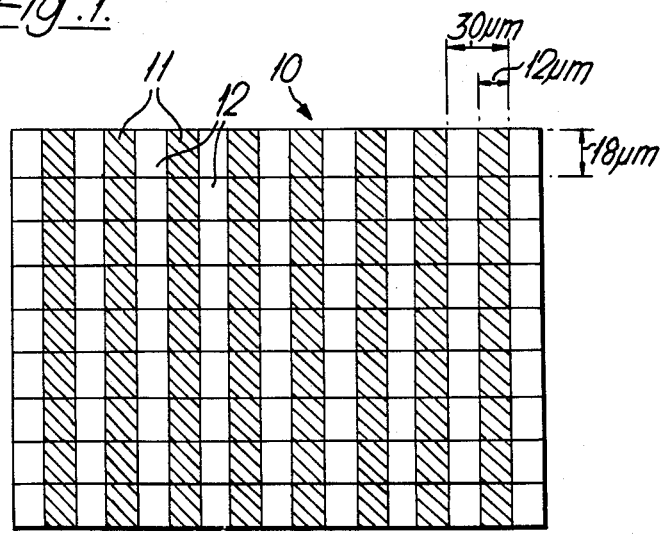

United States Patent [19]

Baker

[11] Patent Number: 4,641,038

[45] Date of Patent: Feb. 3, 1987

[54] IMAGING DEVICE

[75] Inventor: Mark G. B. Baker, Edinburgh, Scotland

[73] Assignee: Ferranti, plc, Cheshire, England

[21] Appl. No.: 507,677

[22] Filed: Jun. 22, 1983

[30] Foreign Application Priority Data

Jun. 24, 1982 [GB] United Kingdom ............... 82185550

[51] Int. Cl.[4] ........................ H01J 40/14; H04N 3/12
[52] U.S. Cl. ..................... 250/578; 250/208; 250/332; 350/6.2; 350/6.4; 358/212; 358/213
[58] Field of Search ........................ 250/208, 578, 332; 350/6.2, 6.4; 358/212, 213

[56] References Cited

U.S. PATENT DOCUMENTS

| 3,980,817 | 9/1976 | Penn . | |
| 4,005,285 | 1/1977 | Price | 250/208 |
| 4,009,388 | 2/1977 | Seachman | 250/208 |
| 4,141,624 | 2/1979 | Siegmund | 350/6.2 |
| 4,484,793 | 11/1984 | Laude | 350/6.4 |

FOREIGN PATENT DOCUMENTS 0029568 6/1981 European Pat. Off. .

OTHER PUBLICATIONS

H. J. Caulfield, Handbook of Optical Holography, 1979, Academic Press, p. 371.
Queener, "Scanner for Multiplexing Images onto Individual Photodiodes", IBM Technical Disclosure Bulletin, vol. 18, No. 6, Nov. 1975, p. 1746.

Primary Examiner—S. C. Buczinski
Attorney, Agent, or Firm—Kerkam, Stowell, Kondracki & Clarke

[57] ABSTRACT

A solid state imaging device (FIG. 2) includes an array 10 of photoelectric elements 11 on which an image is formed, and overcomes poor resolution due to insensitive areas 12 between elements by interposing between a focussing lens 13 and the array an optically transmissive member in the form of a rotatable disc 15 having parallel faced portions of different thickness 16, 17 which extend into the optical axis of the focussing means in turn and are-inclined thereto to displace the image laterally on the array. The difference in thickness causes an image displacement equal to half of the element pitch and signals of each image displacement are stored in frame stores 21, 22 from which they may be read to provide the equivalent of a higher density array. Disc portions may be the same thickness but of different refractive indices or angles to the optical axis. A larger number of portions (FIG. 5) may be used to give more displacements. The disc may be provided with color filters interposed sequentially with rotation to enable a colored image to be reproduced. A second optically movable member may be operative in a different plane and at a different rate to effect image displacement in two dimensions.

18 Claims, 7 Drawing Figures

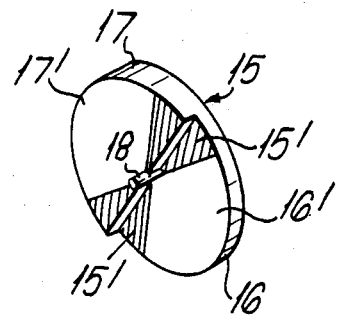
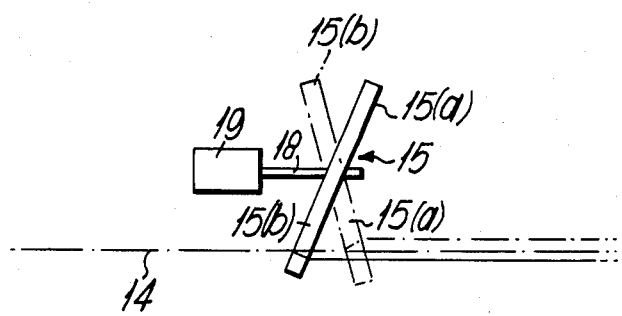
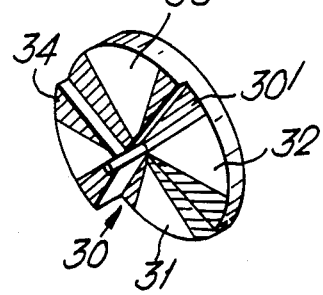
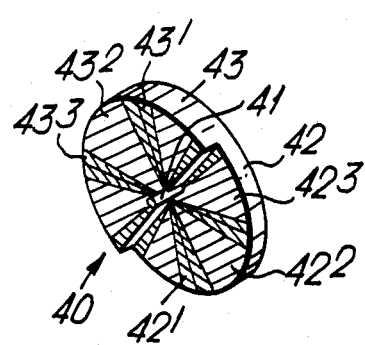

IMAGING DEVICE

This invention relates to imaging devices and particularly to solid state devices of the type comprising an array of photoelectric elements on which an image is formed optically and photoelectric signals produced thereby are extracted for signal processing or formation of a corresponding image elsewhere.

One type of solid state imaging device which is used for its compact size and ruggedness is the charge coupled device (CCD) image sensor in which an array of photoelectric elements are arranged in rows and columns of a rectangular matrix, signals representing the intensity of parts of an image incident on the elements being clocked one row or column at a time into a frame store, which may be formed integrally with the array, enabling signal production suitable for conventional scanned raster television display or for signal processing.

A constructional feature of some sensors is that gaps exist between photoelectric elements in one coordinate direction, usually in the direction of clocking along rows of the array but with elements contiguous in the other coordinate direction (columns).

The spacing between adjacent elements in said one coordinate direction may be greater than the extent of the elements themselves, for example, elements may be 12 $\mu$m wide set at 30 $\mu$m pitch resulting in a gap of 18 $\mu$m between elements. Clearly the resolution in that coordinate direction resulting from such spacing may be unsatisfactory for applications in which a high resolution image is as important as the physical characteristics of the solid state sensor.

Low resolution resulting from the element separation and pitch frequency in said one coordinate direction may be accompanied by a further effect when signals derived from such a sensor are applied to a colour reproducing CRT in which the shadow mask/phosphor triads are of the same order of magnitude as the pitch frequency of sensor elements. 'Beating' may occur between the two frequencies resulting in further loss of resolution.

It has been proposed, for example in European Patent Application No. 0,029,568, to enhance the resolution of such a device by means of image displacement, that is, forming in timed succession a plurality of N images of portions of the same source on the device surface, each image being displaced in the plane of the device surface with respect to the others so that different parts of the image fall on the active photoelectric elements, storing the electrical signals produced by each such image formed and recombining the signals in the correct timed order to produce a composite signal corresponding to a signal produced by an imaging device having N times the resolution.

The arrangements described embodying the method employ electro-optical elements such as liquid crystal shutters and deflectors or electro-acousto-optical deflectors or piezo-electric deflectors and polarizing mirrors.

The use of such deflectors or shuttering elements leads to a complex device, both in terms of the expensive elements used and the nature of the assembly required by their use. Those elements which involve no physical movement require relatively complex optics and/or the provision of shuttering means aligned and/or assembled with the photoelectric device, whilst those embodiments involving piezoelectric beam deflection require very accurate alignment and by the nature of the components cannot be expected to function in a mechanically harsh environment without frequent checks or alignment.

It is an object of the present invention to provide an imaging device, including an array of photoelectric elements, which is capable of a higher resolution than is provided by the spacing of the elements alone and having a construction which by the use of readily available and simple components can be effected at lower cost and operate readily in harsher environments than known arrangements.

According to the present invention an imaging device includes a two-dimensional array of photoelectric elements spaced apart in at least one coordinate direction of the array, focussing means operable to produce an image of a subject in a focal plane at the array elements an optically transmissive member movable through the field of view of the photoelectric elements having first and further portions and operable with the first portion thereof in said field of view of the elements to cause a first part of the image to fall upon the elements and operable with each further portion thereof in the field of view of the elements to displace the image with respect to the first part in the direction of said one coordinate direction to cause a different part of the image to fall upon the elements.

Figure 2:
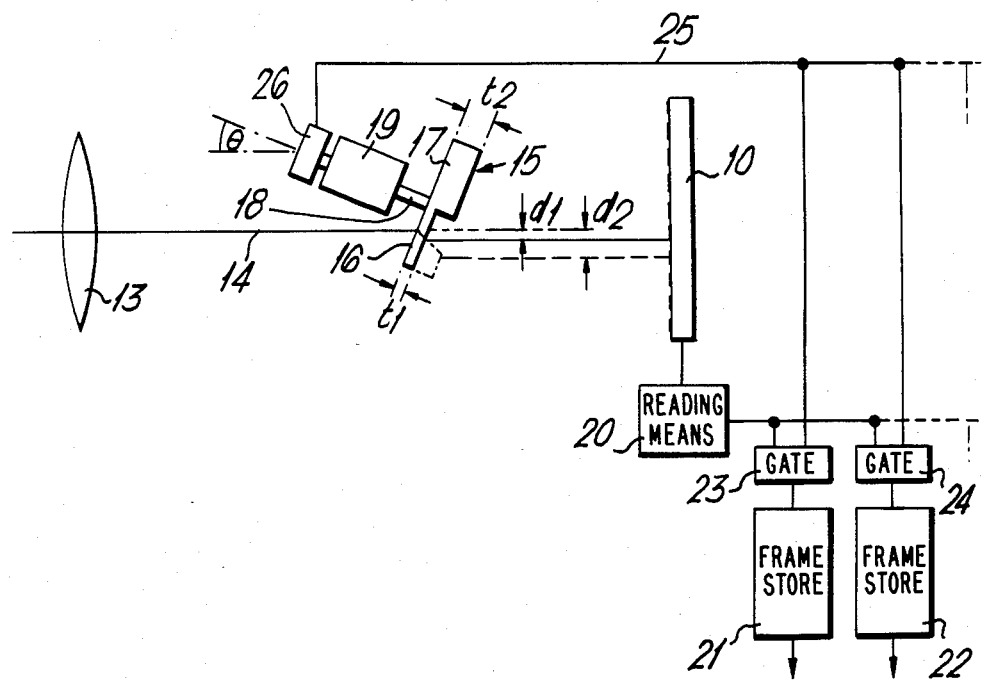
Figure 7:
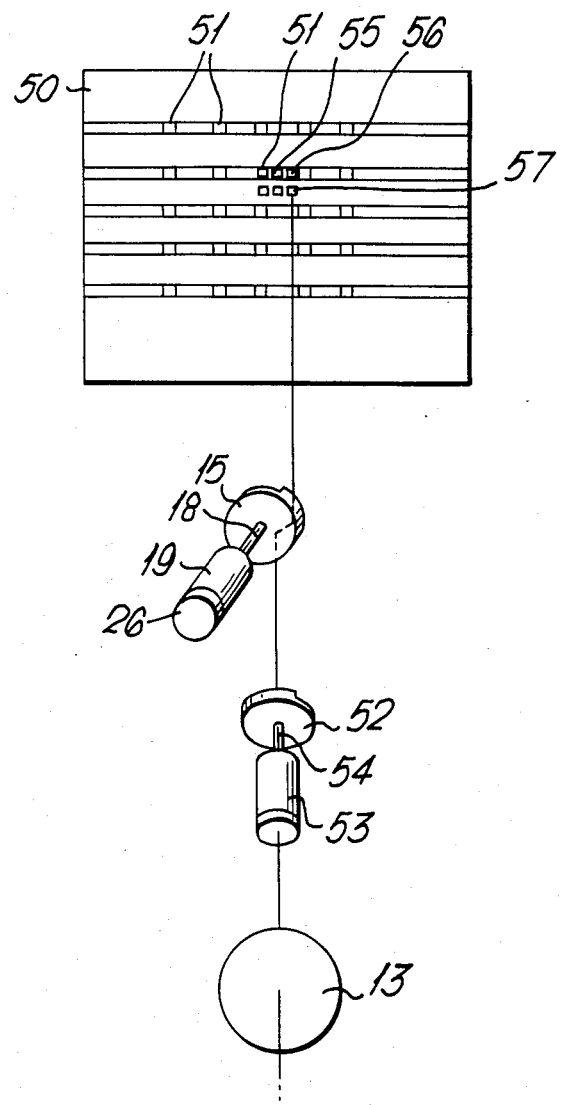

Embodiments of the invention will now be described by way of example with reference to the accompanying drawings, in which:

FIG. 1 is a frontal representation of a conventional form of CCD image sensor illustrating the distribution of optically photoelectric sensors in a rectangular matrix array, FIG. 2 is a plan view of an imaging device according to the present invention including a single optical member, FIG. 3 is a perspective view of the optical member of FIG. 2 able to provide two displaced parallel beam paths, FIG. 4 is a plan view of an alternative form of optical member, FIG. 5 is a perspective view of an alternative form of optical member able to provide four displaced parallel beam paths, FIG. 6 is a perspective view of an optical member, similar to that of FIG. 3 but including filter means for producing a colour image, and FIG. 7 is a perspective view of an imaging device also according to the present invention including two optical members.

Referring to FIG. 1 a solid state imaging device 10 is formed of a charge coupled device (CCD) structure comprised of a plurality of photoelectric sensor elements 11 arranged in a two-dimensional array giving 380 columns × 488 rows.

The photoelectric elements each measure 12 $\mu$m in the direction of the rows of the array and 18 $\mu$m in the direction of the columns. The structure of the device is such that the photoelectrically generated signals are clocked out along the rows of the array and the photoelectric elements in each row are separated by an insensitive region 12 of 18 $\mu$m × 18 $\mu$m. Adjacent rows are contiguous such that the array columns are substantially continuous.

The electrical connections to, and functioning of, such a device are well known and require no further detailed description; it is sufficient to say that when an image of a subject is focussed onto the surface of the array, potentials are developed at the photoelectric elements depending upon the intensity of the image parts incident thereon, said potentials being shifted, or clocked, out one row at a time for storage and/or reproduction by an imaging device such as a C.R.T.

It will be appreciated that in the direction of the rows, the photoelectric elements are receptive of only 40 percent of the image and as discussed above the image resolution in this direction may not be adequate.

The imaging device of the present invention is shown in plan view in FIG. 2 and includes such an image sensor array 10 which on its own is unable to provide adequate resolution. The device also includes focussing means, shown as lens 13, which has a focal plane for an image of a subject (not shown) coincident with the surface of the photoelectric elements 11. The focussing means has an optical axis 14 to which the plane of the array is perpendicular. Between the focussing means and the array is an optically transmissive member. The optically transmissive member, shown also in FIG. 3, comprises a disc 15 of transparent glass or plastics material divided into two semicircular portions 16, 17 of different thicknesses each portion having parallel faces. Parts of each portion are rendered opaque, particularly as shown at 15' at the interface between portions, defining a transparent window 16', 17' in each portion respectively. The disc is mounted on a shaft 18, whose longitudinal axis makes an angle $\theta$ with the optical axis 14 of the focussing means, for rotation by means of a drive motor 19 and is located such that one window portion at a time of the disc intersects the optical axis 14.

It will be seen from FIG. 2 that the disc acts as a parallel sided prism and light passing through the disc will be displaced with respect to the optical axis 14 by a distance d which is a function of the thickness t of the disc portion, the refractive index n of the portion material and the angle $\theta$.

Initially the device is arranged such that with the section 16 of the disc, of thickness t, in the optical axis 14 the axis is displaced by a distance $d_1$ and as $14_1$ meets the photoelectric sensor array. The image for which this forms the optical axis is called the undisplaced image. The thickness $t_2$ of the portion 17 of the disc is chosen such that the axis 14 is displaced by a distance $d_2$ to $14_2$, the displacement with respect to $14_1$ i.e. $(d_2-d_1)$, being equal to half the element row pitch, i.e. 15 $\mu$m. The image which thus forms on the array is called the displaced image. The displacements shown in the figure are exaggerated to ease understanding of the invention.

In operation the disc 15 is rotated continuously and during a first half of its rotation cycle when the window portion 16' is in the optical axis the undisplaced image formed on the array surface has a first part thereof incident upon the sensitive areas of the photoelectric elements 11 while the rest is incident upon the insensitive intermediate areas 12. When the window portion is replaced by an opaque portion, which acts as a shutter, suitable electrical signals produced at the photoelectric elements are clocked out of the array row-by-row in known manner by reading means 20 and stored in an image frame store 21.

For the second half of the rotation cycle of the disc 15, the window portion 17' displaces the image by 15 $\mu$m along the rows, that is, in the direction of the separation between elements, such that the part of the image which was previously incident upon photo-electric elements is incident on insensitive areas and some of that part of the image which previously was incident on insensitive areas is now incident upon photoelectric elements. When this window portion is replaced by the adjacent opaque portion the different part of the image has formed electrical signals at the photoelectric elements which are similarly clocked out by reading means 20 and stored in a second frame store 22. The frame stores 21, 22 may be formed integrally with the array or one or both may be separate devices as shown for clarity.

The electrical signals are directed into the correct store by gating means 23, 24 operable in synchronism with the rotational position of the disc 15 by means of a signal on line 25 from a position transducer 26 driven by shaft 18.

To reproduce the image on a non-interlaced-raster scan CRT display the stored signals derived from each element read from the frame stores 21 and 22 are multiplexed to provide individual pixels of the raster image formed, adjacent pixels of each line pair being due to the optical shifting of the image by the optically transmissive member 15.

In the device described above two frame stores are used in order to enable signals representing each of the complete displaced images to be stored before reading the signals simultaneously in order to assemble a single display image.

It will be appreciated that if scanning rates of the image sensor and display tube are suitable one store only may be used to store signals due to either the displaced or undisplaced image, the signals due to the other image being taken directly to the display CRT and multiplexed with signals read from the one store.

The imaging device may be used to provide an interlaced raster form of CRT image. Where such an interlaced reproduction is employed it is preferable, but not essential, to arrange for the direction of displacement of photoelectric elements i.e. direction of shift of the optical image, to correspond to the direction of shift between the rasters of the CRT image.

With such an arrangement it will be appreciated that it is possible to employ one only of stores 21 or 22 to store the image signals of one display frame associated with each raster successively or, if the images can be formed and signals thereof clocked out at a suitable rate, the signals may be impressed upon the reproduction rasters directly without any intermediate storage.

It will be appreciated that once signals representing the undisplaced and displaced images are clocked out of the array and, if appropriate, stored they may be utilised other than to reproduce an image of the subject or utilised to reproduce such an image in any convenient manner.

The imaging device described above will be seen to be capable of rugged construction despite the provision of a movable optically transmissive member. In practice any small translational movement of the member with respect to the optical axis 14 will not affect the magnitude of the displacement $d_1$ or $d_2$ provided its inclination $\theta$ remains unchanged and even such a variation in $\theta$ will result only in a small change in the values $d_1$ or $d_2$ if $\theta$ is initially small.

As an example of parameters of t, n and $\theta$ suitable for giving the image displacement $(d_2-d_1)$ of 15 $\mu$m discussed above, a refractive index n of 1.55 and, an angle θ of 5° requires a difference in thickness between disc portions of 0.48 mm.

The optically transmissive member 15 as described is formed with the two portions 16, 17 of the same refractive index but of different thicknesses, to give different displacements by which the image displacement $(d_2-d_1)$ corresponds to half the column pitch of the array. In an alternative construction the member may be made of uniform thickness but having portions of different refractive indices to achieve the same image displacements. Again, as an example, a disc of uniform thickness of 1.9 mm inclined at an angle of 5° to the optical axis would require portions of refractive index 1.51 and 1.75 respectively to achieve said difference in displacement of 15 $\mu$m. Alternatively, the two portions may be of the same thickness and refractive index but inclined differently to the axis 14, for example, by being inclined to the shaft 18 so as to vary the effective value of angle θ for the two portions and thus the magnitude of displacement.

In such a case the inclination of shaft 18 to the optical axis 14, is unimportant and may be reduced to zero, the angles between the portions and shaft being chosen to present the correct inclination to the optical axis 14.

The provision of portions inclined at different angles to the shaft 18 (and indeed of different thickness) may require the provision of balancing weights if the shaft is rotated at high speed.

One special case of the above mentioned arrangements in which the different portions of the optically transmissive member are inclined differently to the optical axis when positioned therein, is shown in plan view in FIG. 4. The optically transmissive member 15 is formed of a disc of uniform thickness and refractive index mounted on a shaft 18 at an angle $\phi$ to the axis of the shaft. The shaft axis extends parallel to the optical axis 14. The disc is made opaque over portions thereof to define transparent windows 15(a) and 15(b) at 180° intervals similar to that shown in FIG. 3. The angle $\phi$ is chosen with respect to the thickness and refractive index of the disc such that when window portions 15(a) and 15(b) intersect the optical axis 14, they are equally, but oppositely, inclined to the optical axis (as shown by broken line representation for 180° rotation) and each displace the image laterally of the optical axis by half of the displacement required of the image on the array. The image formed by way of one transparent portion is considered the undisplaced image while the image formed by way of the other portion in considered the displaced image.

It will be appreciated that by displacing a focussed image laterally by means of refraction through an inclined disc the optical path length between the lens and array is increased thereby tending to defocus the image. In the arrangement shown in FIG. 4, the change of path length is the same for each displacement enabling precise focus to be maintained, once the presence of the disc member is compensated for.

To compensate for defocussing caused by different path lengths in the previously described embodiments then one or each inclined portion of the disc may have associated therewith a block of transparent material having parallel faces normal to the optical axis 14 which is moved through the optical axis in synchronism with the displacing portion, to alter the effective path length of the image so that for each portion the path length is the same and the focal planes coincident. Such a block or blocks may be formed of a second disc driven in synchronism with that forming the optically transmissive member, or may be formed by blocks carried with the member portions but inclined thereto so as to pass through the optical axis 14 normal thereto.

The above outlined variants may be used in combination to secure the different image displacements.

It will be readily understood that the optically transmissive member may take a form other than the rotatable disc thus far described. For instance the member may comprise one or more blocks of different thickness and/or refractive index reciprocable linearly through the optical axis 14, or a single such block tiltable between preset anglar positions. If movement of the optically transmissive member causes a continuously variable displacement then a shutter means, for example, in the form of opaque portions as described with reference to FIG. 3 may be provided to expose the array to the image only when predetermined image displacements have been effected.

In the embodiment described above with reference to FIG. 2 it is convenient, having regard to the dimensions and spacing of the photoelectric elements of the array, to displace the image just once by half the element pitch. It will be appreciated that the present invention may be employed where the spacing between elements is much greater than the element width. Considering as an example an array similar to that shown in FIGS. 1 and 2 but with the photoelectric element (column) separation 60 $\mu$m, a suitable optically transmissive member is shown at 30 of FIG. 5. As with the member 15 shown in FIG. 3, this member comprises a disc of transparent glass or plastics material of uniform refractive index and rotatable about shaft 18 but divided into four portions 31-34 of different thickness. The relationship between the thicknesses is such that the shaft 18 located at an angle θ as in FIG. 2, the undisplaced part of the image, i.e. that part initially incident upon sensitive elements by the thinnest portion 31, is displaced by successive displacements of 15 $\mu$m by each location of each successive portion 32-34 in the optical axis of the focussing means 13. The disc 30 may be provided with opaque portions 30', similar to those 15' of FIG. 3, to effect a shuttering means defining windows at the different thickness.

Depending on the method of reproducing images from the signals the device will require up to four frame stores, similar to those 21 and 22 in FIG. 2, which are addressed in synchronism with the rotational position of the disc determined by transducer 26 as described previously.

The above described embodiments both cause displacements of the image which are greater than the width of the elements so that there is no overlap of the successively displaced image portions on the photoelectric elements.

Any such overlap leads to deterioration of the image signals but it may be desirable to risk such deterioration rather than losing part of the image. For instance, in the above described embodiment wherein the spacing of columns 60 $\mu$m, the disc 30 may be provided with five portions the difference in thickness between portions creating an image displacement increment of 12 $\mu$m. Thus each part of the image is caused to fall upon a photoelectric sensor with no gaps between them, but clearly any error in position between components of the device or image registration will lead to overlapping of image parts on the photoelectric sensors.

It will be understood that a similar effect of multiple displacements may be achieved by the above described devices having the portions of different refractive indices and/or making different angles to the shaft 18. Similarly any non-disc embodiment of the optically transmissive member constructive other than a rotatable disc may be provided with a larger number of portions.

The imaging device so far described produces signals independently of any colour content of the image, that is, it is a monochrome device. It is known to produce colour images from solid state arrays of photoelectric elements by employing dichroic mirror arrangements to develop three beams, each comprising parts of the image in one of the three primary colours. The three beams are each directed onto a separate sensor array. However in order to obtain correct registration between the separate colour images the arrays must be accurately located and protected from any disturbances.

This is not always possible to achieve and it is possible to view the separate colour images serially with a single array, by means of interposing the different filters sequentially in the field of view of and store the images associated with each primary colour in a frame store, from which stores the signals may be read to reproduce a composite colour image on a conventional colour television CRT display.

Such an arrangement may be adopted in the device of the present invention by modifying the optically transmissive member as shown in FIG. 6. The member comprises a disc 40, similar to that of FIG. 2 of uniform refractive index rotatable about a shaft 41 and divided into different portions 42, 43 of different thickness. Each portion is further sub-divided into segments, e.g. $42_1$, $42_2$, $42_3$, each of which possesses filter characteristics limiting light transmission to one of the primary colours. The segments are separated by opaque segments 40' forming shutters as described above. A separate frame store similar to stores 21, 22 is provided for each colour segment and to which image signals are clocked by means 20 in synchronism with the rotation of the disc. The signals are read from the frame stores associated with each disc portion i.e. image displacement simultaneously and multiplexed for display in conventional manner.

The segments may be formed by securing a suitable filter material to an otherwise transparent disc or by manufacturing the disc of discrete self-coloured segments. Furthermore the segments may include neutral density filters to control the ratio of intensities of the component colour signals in a manner suitable for direct reproduction. An alternative method of providing the correct signal ratios for reproduction is by varying the arcuate length of the segment windows 43.

Clearly any disc may be provided with colour filtering signals in this way irrespective of the number of displacement causing portions, provided that each image can be formed and signals thereof clocked out and stored for each segment.

As an alternative to providing three colour signals for each image displacement it will be appreciated that if there are a sufficient number of displacements each displacement may be associated with a single colour, particularly if the magnitude of displacement corresponds to the separation of colour defining portions of the reproducing means.

So far the description has been made with reference to a sensor array of the CCD type shown in FIG. 1, in which photoelectric elements are substantially contiguous in one coordinate direction but spaced apart in the other. It will be appreciated that the array may be formed of photoelectric elements other than part of a CCD structure and/or may be configured with the elements displaced in both coordinate directions.

A second optically transmissive member may be employed to effect image displacements in this second coordinate direction as shown in FIG. 7.

A sensor array 50 comprises individual photoelectric elements 51 spaced apart in rows and columns. Focussing means 13 has an optical axis 14 and focusses an image of a subject onto the surface of the sensor array 50. A first optically transmissive member in the form of disc 15 extends into the optical axis and is rotatable by motor 19 about axis 18 inclined laterally of the optical axis in a horizontal plane to cause displacement of the image by portions of different thickness in the direction of the elements rows.

A second optically transmissive member in the form of a disc 52 also extends into the optical axis and is rotatable by motor 53 about axis 54 inclined to the optical axis in a vertical plane to cause displacement of the image by portions of different thickness in the direction of the element columns.

It will be appreciated that the order in which the discs are arranged along the optical axis is a matter of choice. In the array shown in this example the dimensions and spacing of the photoelectric elements are such that the portion of image incident on each element may be displaced laterally along the rows twice as shown at 55 and 56 and vertically down the columns once as shown at 57 in order to form a total of six displaced images different parts of which are incident on the photoelectric sensors at each image location. Disc 15 is divided into three portions of different thickness (or other means of causing displacements) and the disc 52 is divided into two such portions and is rotated at half the rate of disc 15 providing a sequence of six displacements as shown for the image portion initially incident on element 51.

In general terms if the disc 15 has N portions and the disc 52 has m portions the disc 15 is rotated at m times the rate of disc 52 and N×m times for each complete optical image conversion.

The optically transmissive members may include colour filtering means as described above to enable a colour reproduction of the subject and the image signals are clocked out to appropriate frame stores in synchronism with the rotation of the discs 15 and 52.

In both of the embodiments described above and the array of photoelectric elements has been considered as a rectangular matrix. It will be appreciated that the coordinate directions need not be orthogonal and any coordinates system, such as polar coordinates, may be served by appropriate inclination of the optically transmissive member.

What we claim is:
1. An imaging device including:
   a two-dimensional array of photoelectric elements spaced apart in at least one coordinate direction of the array,
   focusing means operable to produce an image of a subject in a focal plane at the array elements,
   a substantially planar member arranged to be rotated about an axis and having first and further discrete parallel-faced optically transmissive portions disposed circumferentially about the rotation axis, said portions being movable one at a time through the field of view of the photoelectric elements such that with the first portion thereof in said field of view of the elements a first part of the image is caused to fall upon the elements and with each further portion thereof in the field of view of the elements the image is displaced with respect to the first part in said one coordinate direction to cause a different part of the image associated with each portion to fall upon the elements.

2. An imaging device as claimed in claim 1 in which the element spacing in said one direction is greater than the element dimensions in said direction.

3. An imaging device as claimed in claim 1 in which each displacement in said one direction is arranged to produce a non-overlapping image on any of the photoelectric elements.

4. An imaging device as claimed in claim 1 in which each displacement is arranged to be equal to the ratio of the distance between photoelectric element centres and the number of portions of the optical member.

5. An imaging device as claimed in claim 1 in which said axis of rotation is normal to the plane of the member and inclined at an acute angle to the optical axis of the focussing means, which optical axis passes through said parallel faces of the portion in the field of view of the photoelectric elements so as to be displaced in said direction of one coordinate of the array.

6. An imaging device as claimed in claim 5 in which the planar member comprises an optically transmissive disk of which said first and further portions comprise segments.

7. An imaging device as claimed claim 5 or in claim 6 in which the different portions of the member are of different thicknesses to achieve said different displacements.

8. An imaging device as claimed in claim 5 or claim 6 in which the different portions of the member are of different refractive indices to achieve said different displacements.

9. An imaging device as claimed in claim 1 in which the planar member has said first and one further portion formed of uniform thickness and refractive index and disposed upon opposite sides of the axis of rotation, the axis of rotation being non-normal to the plane of the member and inclined towards one of said portions, the member being disposed such that the axis of rotation and the optical axis of the focussing means define a plane including said direction of one coordinate of the array.

10. An imaging device as claimed in claim 1 in which the optically transmissive member has associated with each portion thereof colour filter means operable to split the image in synchronism with movement of each portion through the field of view of the elements into successive images in the three primary imaging colours.

11. An imaging device as claimed in claim 10 in which each portion comprises sections having the light transmitting characteristics of said filter means.

12. An imaging device as claimed claim 1 in which the photoelectric elements comprise part of a charge coupled device.

13. An imaging device as claimed in claim 1 including storage means operable to receive signals relating to the parts of the image incident upon the photoelectric elements.

14. An imaging device as claimed in claim 13 in which the storage means is arranged to store signals received due to each displacement by each portion of the image by the optically transmissive member.

15. An imaging device as claimed in claim 1 in which the photoelectric elements are spaced also in the other coordinate directions and including a further optically transmissive member, having first and further portions, associated with said other coordinate direction and movable through the field of view of the photoelectric elements being operable with the first portion thereof in said field of view of the elements to cause a first part of the image to fall upon the elements and operable with each further portion thereof in the field of view of the elements to displace the image with respect to the first part in the direction of said other coordinate to cause a different part of the image associated with each portion to fall upon the elements.

16. An imaging device including:
a two-dimensional array of photoelectric elements spaced apart in at least one coordinate direction of the array;
focussing means operable to produce an image of a subject in a focal plane at the array elements;
an optically transmissive member movable through the field of view of the photoelectric elements having first and further portions and operable with the first portion thereof in said field of view of the elements to cause a first part of the image to fall upon the elements and operable with each further portion thereof in the field of view of the elements to displace the image with respect to the first part in the direction of said one coordinate to cause a different part of the image associated with each portion to fall upon the elements;
the optically transmissive member being arranged such that said portions are moved successively through the field of view of the elements repetitively; and
the different portions of the optically transmissive member being of different refractive indices to achieve said different displacements.

17. An imaging device including:
a two-dimensional array of photoelectric elements spaced apart in at least one coordinate direction of the array;
focussing means operable to produce an image of a subject in a focal plane at the array elements;
an optically transmissive member movable through the field of view of the photoelectric elements having first and further portions and operable with the first portion thereof in said field of view of the elements to cause a first part of the image to fall upon the elements and operable with each further portion thereof in the field of view of the elements to displace the image with respect to the first part in the direction of said one coordinate to cause a different part of the image associated with each portion to fall upon the elements; and
the optically transmissive member having asociated with each portion thereof colour filter means operable to split the image in synchronism with movement of each portion through the field of view of the elements into successive images in the three primary imaging colours.

18. An imaging device as claimed in claim 17 in which each portion comprises sections having the light transmitting characteristics of said filter means.

* * * * *